United States Patent
Foit et al.

(10) Patent No.: US 12,392,045 B2
(45) Date of Patent: Aug. 19, 2025

(54) ELECTRODE MATERIAL, METHOD FOR THE PRODUCTION THEREOF, AND USE OF SAME

(71) Applicant: Forschungszentrum Jülich GmbH, Jülich (DE)

(72) Inventors: Severin Foit, Linnich (DE); L. G. J De Haart, EA Vaals (NL); Vaibhav Vibhu, Jülich (DE); Rüdiger-A Eichel, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 425 days.

(21) Appl. No.: 17/767,157

(22) PCT Filed: Oct. 7, 2020

(86) PCT No.: PCT/EP2020/078132
§ 371 (c)(1),
(2) Date: Apr. 7, 2022

(87) PCT Pub. No.: WO2021/083624
PCT Pub. Date: May 6, 2021

(65) Prior Publication Data
US 2022/0372639 A1    Nov. 24, 2022

(30) Foreign Application Priority Data
Oct. 28, 2019   (DE) .................. 102019129070.8

(51) Int. Cl.
*C25B 11/042*    (2021.01)
*C25B 1/04*       (2021.01)
(Continued)

(52) U.S. Cl.
CPC .......... *C25B 11/042* (2021.01); *C25B 11/054* (2021.01); *C25B 11/073* (2021.01);
(Continued)

(58) Field of Classification Search
CPC ........ H01M 4/9033; H01M 2008/1293; C25B 11/0773; C25B 1/04–044
See application file for complete search history.

(56) References Cited

U.S. PATENT DOCUMENTS

2006/0255310 A1    11/2006  Funahashi
2020/0136156 A1*    4/2020  Liu .................. H01M 8/04067

FOREIGN PATENT DOCUMENTS

WO    2017075429 A1    5/2017

OTHER PUBLICATIONS

Berger et al., Synthesis and characterization of the novel K2NiF4-type oxide Pr2Ni0.9Co0.1O4 + δ, 316 Solid State Ionics 93 (Year: 2018).*

(Continued)

*Primary Examiner* — Hosung Chung
(74) *Attorney, Agent, or Firm* — Occhiuti & Rohlicek LLP

(57) ABSTRACT

A material for an electrode, the material for as well as a method of making the material for an electrode comprising or consisting of a compound of formula (1)

$M_2Ni_{1-x}Co_xO_{4+\delta}$ and/or of formula (2)

$La_{1-y}M_yNi_{1-x}Co_xO_{4+\delta}$ where M represents Pr and/or Nd, $0.0 \leq x \leq 0.2$, $0.25 \leq \delta \leq 0.3$ and $0 < y \leq 10$ 0.5.

7 Claims, 1 Drawing Sheet

(51) Int. Cl.
    C25B 11/054    (2021.01)
    C25B 11/073    (2021.01)
    C25B 11/077    (2021.01)
    H01M 4/90      (2006.01)
(52) U.S. Cl.
    CPC ....... *C25B 11/0773* (2021.01); *H01M 4/9033* (2013.01); *H01M 4/9066* (2013.01); *C25B 1/04* (2013.01)

(56) References Cited

OTHER PUBLICATIONS

Alejandra Montenegro-Hernndez Et Al: "Thermal stability of LnNiO (Ln: La, Pr, ND) and their chemical compatibility with YSZ and CGO solid electrolytes" International Journal of Hydrogen Engergy, Elseiver Science Publishes B.V., Barking, GB, Bd. 36, Nr. 24, (Aug. 20, 2011).

V. Vaibhav Et Al: "Electrochemical ageing study of mixed lanthanum/praseodymium nickelates $La_2$—$xPr_xNiO_{4+delta}$ as oxygen electrodes for solid oxide fuel or electrolysis cellst". Journal of Energy Chemistry, Bd. 46, 24. (Oct. 24, 2019).

Berger Christian Et Al: "Synthesis and characterization of the novel $K_2NiF_4$-type oxide $Pr_2Ni_{0.9}Co_{0.1}O_{4+[delta]}$", Solid State Ionics, North Holland Pub. Company. Amsterdam; NL, NL, Bd. 316, 4. (Jan. 4, 2018).

International Search Report, Sep. 2, 2021, 4 Pages.

* cited by examiner

ELECTRODE MATERIAL, METHOD FOR THE PRODUCTION THEREOF, AND USE OF SAME

CROSS REFERENCE TO RELATED APPLICATIONS

This application is a U.S. national stage application of International Application no. PCT/EP2020/078132, filed Oct. 7, 2020, which claims the benefit of the filing date of German Application No. 10 2019 129 070.8, filed Oct. 28, 2019, the contents of which are hereby incorporated by reference in their entirety.

The invention relates to an electrode material, a method for the production thereof and the use of same for fuel cells and for electrolysis, in particular for high-temperature electrolysis, as an air or oxygen electrode.

Electrolysis is a process in which electric current forces a redox reaction. It is used for example to extract metals or to produce substances that would be more expensive or very difficult to obtain using purely chemical processes. Examples of important types of electrolysis are the production of hydrogen, aluminum, chlorine and caustic soda.

Electrolysis requires a DC voltage source which supplies the electrical energy and drives the chemical reactions. Part of the electrical energy is converted into chemical energy. Batteries, accumulators or fuel cells serve exactly the opposite purpose, the conversion of chemical energy into electrical energy, i.e. they serve as a voltage source. Electrolysis can therefore be used to store energy, for example in the electrolysis of water, which yields hydrogen and oxygen, which have been proposed as energy carriers. By reversing the water electrolysis in a fuel cell, approximately 40% of the electrical energy originally used can be recovered.

For the electrolysis of water, so-called high-temperature (steam) electrolysis (at 700 to 1000° C.) on solid electrolytes is also used. Yttrium-stabilized zirconium dioxide (YSZ) is usually used as the solid electrolyte. Alternatively, Sc or Ca-doped ZrO Gd or Sm-doped CeO or even electrolytes with a perovskite structure (e.g. based on LaGaO doped with Sr and/or Mg) can be used. Due to the increased operating temperature, the required voltage at the thermo-neutral operating point can be reduced to 1.30 V, and the current density is 0.4 A/cm². Furthermore, the efficiency is improved.

WO 2008/061782 A2 describes so-called air electrodes in general. This prior art relates to a thin and essentially unsupported solid oxide cell comprising at least a porous layer, an electrolyte layer and a porous cathode layer, with the anode layer and the cathode layer having an electrolyte material, at least one metal and a catalyst material, and the total thickness of the thin reversible cell being approximately 150 µm or less.

Perovskites for air electrodes are also known, for example from U.S. Pat. No. 7,803,348 B1. This document describes that the oxygen is reduced in the presence of a catalyst at the cathode of an alkali electrolyte fuel cell. Catalysts of formula $Sr_{3-x}A_{1+x}Co_{4-y}B_yO_{10.5-z}$, where the values for x, y and z are within defined ranges and A represents Eu, Gd, Tb, Dy, Ho or Y and B represents Fe, Ga, Cu, Ni, Mn and Cr, exhibit high catalytic activity and high chemical stability when used as an oxygen reduction catalyst in alkaline fuel cells.

Nickelates are also known from the prior art. For instance, WO 2017/214152 A1 describes a solid oxide fuel cell having an anode, an electrolyte, a cathode barrier layer, a nickelate composite cathode which is separated from the electrolyte by the cathode barrier layer, and with a cathode current collector layer being provided. The nickelate composite cathode contains a nickelate compound and a second oxide material, which can be an ionic conductor. The composite can further comprise a third oxide material. The composite material can have the following general formula $(Ln_uM1_vM2_S)_{n+1}(Ni_{1-t}N_t)_nO_{3n+1}-A_{1-x}B_xO_y\ C_wD_zCe_{(1-w-z)}O_{2-\delta}$, where A and B can be rare earth metals other than cerium.

Finally, lanthanum cobalt nickelates for use in solid oxide fuel cells are known from US 2012/0064433. This prior art describes a material for a solid oxide fuel cell, which material comprises a lanthanum metal oxide having a perovskite-like crystal structure and a cerium oxide metal.

Proceeding from the prior art, the problem addressed by the invention is therefore that of specifying a material for an electrode, in particular for an air electrode for high-temperature electrolysis, and a method for the production thereof, in which the electrode is improved in terms of performance and service life compared to the electrodes known from the prior art.

The problem is solved according to the invention by a material according to claim 1. Advantageous developments of the invention can be found in the dependent claims.

The invention relates to a material for an electrode, the material comprising or consisting of a compound of formula (1)

$$M_2Ni_{1-x}Co_xO_{4+\delta} \quad (1)$$

and/or of formula (2)

$$La_{1-y}M_yNi_{1-x}Co_xO_{4+\delta} \quad (2)$$

where M represents Pr and/or Nd and $0.0 \le x \le 0.2$, $0.25 \le \delta \le 0.3$ and $0 < y \le 0.5$, in particular 0.5.

When such materials are used in electrodes, for example in air electrodes for high-temperature electrolysis, it has surprisingly been found that the electrode is improved in terms of performance and service life. The term "air electrode" is common in this field, and in particular electrodes at which the reaction of oxygen takes place during the high-temperature electrolysis are referred to as air electrodes. The principles of high-temperature electrolysis are known to a person skilled in the art. They have been described above. The materials according to the invention can be used in these high-temperature electrolysis processes and devices which are known per se, as a result of which the above advantages are achieved.

In one embodiment, x has the values 0.0, 0.1, or 0.2. In another embodiment, δ has the values 0.25, 0.28 or 0.3. If materials according to the invention are provided with these values for x and δ, then particularly performance-improved electrodes with a particularly long service life are obtained.

In one embodiment, the material is selected from $Pr_2NiO_{4+\delta}$, $Pr_2Ni_{0.9}Co_{0.1}O_{4+\delta}$, $Pr_2Ni_{0.8}Co_{0.2}O_{4+\delta}$, $Nd_2NiO_{4+\delta}$, $Nd_2Ni_{0.9}Co_{0.1}O_{4+\delta}$ $Nd_2Ni_{0.8}Co_{0.2}O_{4+\delta}$ and $La_{1.5}Pr_{0.5}Ni_{1-x}Co_xO_{4+\delta}$, where x and δ are as defined above. These materials are particularly suitable as electrodes for high-temperature electrolysis because they have a particularly good performance and service life.

In one embodiment, the material has a perovskite structure, in particular a layered perovskite structure. This structure has proven to be particularly favorable in terms of performance improvement and service life. Such materials having a perovskite structure can be obtained by the method according to the present invention, which will be described below.

In one embodiment, the material for an electrode has an average particle size of 0.5 µm to 1 µm, for example 0.8 µm to 0.9 μm, or 0.5 μm to 0.6 μm. The average particle size can be determined using particle size distribution and scanning electron microscopy (SEM). Particularly favorable electrode materials are provided using these average particle sizes.

The material according to the invention can be used in any form for electrodes. For example, it can be in the form of a layer. In particular, when the material according to the invention for an electrode is in the form of a layer, it can further comprise a compound having formula (3)

$$LaNi_{0.6}Fe_{0.4}O_{3-\delta} \quad (3)$$

where $0<\delta\leq0.05$. This compound of formula (3) can be applied as a layer on the material according to the invention. The current collection is improved with the compound of formula (3).

The present invention also relates to a method for producing a material for an electrode, in particular as described above, comprising the steps of
(a) mixing the oxides of the elements Pr, Nd, Ni, Co, La according to the desired compound of formula (1) or (2),
(b) drying the mixture from step (a), and
(c) annealing the mixture at a temperature of 1000° C. to 1400° C. for 4 hours to 20 hours in air.

Examples of the oxides used in step (a) can be $Pr_6O_{11}$ or $Nd_2O_3$, $La_2O_3$, NiO and $Co_3O_4$. These can be dried in order to largely remove water contained therein. This drying can take place for example at a temperature of approximately 900° C. for e.g. 8 hours to 24 hours, in particular 12 hours to 16 hours. Each oxide used can be dried separately. The oxides can then be mixed in appropriate stoichiometric ratios corresponding to the desired compound of formulas (1) and (2). This can be done in a manner known per se, in the way that solids are usually mixed, e.g. with a ball mill, in particular with zirconia balls. The speed of the ball mill can be 100 to 250 revolutions per minute, for example approximately 250 revolutions per minute. This can take place for 2 hours to 6 hours, in particular approximately 4 hours. Furthermore, the mixing can be carried out in the presence of a liquid. The liquid can act as a liquid phase in which the starting materials are suspended, e.g. organic liquid phases such as isopropanol, ethanol and/or toluene.

The drying step (b) is carried out to remove the contained liquid. In one embodiment, the drying in step (b) can be carried out at 18° C. to 100° C., for example 70° C. to 90° C., e.g. 80° C., for 8 hours to 24 hours, for example 10 hours to 14 hours, e.g. 12 hours.

In one embodiment, the annealing in step (c) can be carried out at a temperature of 1100° C. to 1300° C., for example approximately 1300° C., for approximately 6 hours to 16 hours, for example approximately 12 hours.

In one embodiment, after step (c), the average particle size can be adjusted to 0.5 μm to 1 μm, for example 0.8 μm to 0.9 μm, or 0.5 μm to 0.6 μm, e.g. approximately 1 μm. The average particle size can be determined using particle size distribution and scanning electron microscopy (SEM). These particle sizes can be obtained by means of conventional comminution methods, for example grinding methods, in particular with a ball mill. The ball mill can have zirconia balls. The grinding can take place in the presence of a liquid. The liquid can act as a liquid phase in which the materials are suspended, e.g. organic liquid phases such as isopropanol, ethanol and/or toluene. The grinding can take place for 4 hours to 12 hours, for example 6 hours to 10 hours, e.g. 8 hours. The grinding temperature can be from room temperature to 60° C.

The resulting powders can be processed with liquids and binders to make pastes. These can be applied to half-cells by application techniques such as screen printing, film casting and spraying techniques. Half cells are known per se and are commercially available. This involves an electrode to which an electrolyte layer is applied. The paste of the material according to the invention for an electrode can then be applied to the side of the electrolyte layer that faces away from the electrode which is already present.

After that, another sintering step can be carried out at e.g. 1100° C. to 1200° C., for example 1150° C., for e.g. 0.5 hours to 2 hours, for example 1 hour, in air.

In one embodiment, a layer of $LeNi_{0-6}Fe_{0.4}O_{3-\delta}$, where $0\leq\delta\leq0.05$, can be applied in particular to the layer of the material according to the invention. This makes it possible to improve the current collection.

The invention also relates to the use of the material according to the invention, as described above, as an electrode material for fuel cells and for electrolysis, in particular for high-temperature electrolysis, as an air or oxygen electrode.

The invention will be explained in more detail below on the basis of the description without restricting the general concept of the invention. In the drawings.

EXAMPLE: PRODUCTION AND ELECTROCHEMICAL PROPERTIES OF ELECTRODE MATERIALS

Figure 1:
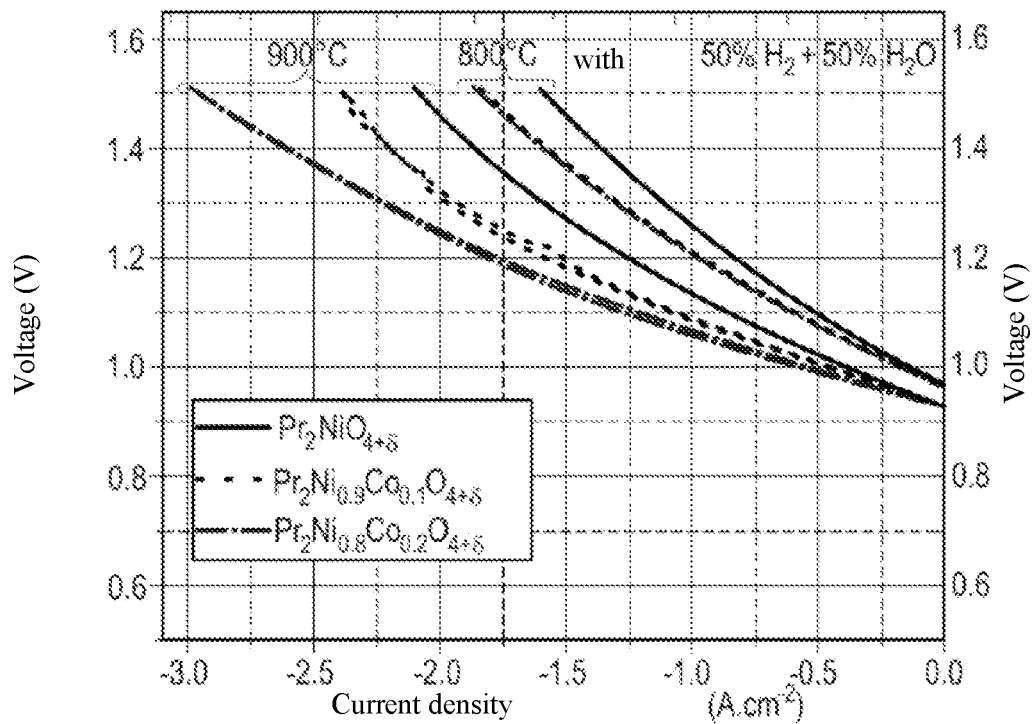
FIG. 1 shows a voltage/voltage density curves for the single cells with PNO, PNCO10 and PNCO20 electrodes at 800 and 900° C.

Preparation of Materials and Characterizations:

Three compositions of each series, namely $Pr_2Ni_{1-x}Co_xO_{4+\delta}$ (PNCO), $Nd_2Ni_{1-x}Co_xO_{4+\delta}$ (NNCO) and $La_{1.5}Pr_{0.5}Ni_{1-x}Co_xO_{4+\delta}$ (LPNCO), (x=0.0, 0.1 and 0.2) were produced according to a solid-state synthesis method. Higher cobalt contents were not taken into account due to the instability of the layer structure. The corresponding precursors were $Pr_6O_{11}$ (Aldrich chem, 99.9%), $La_2O_3$ (Aldrich chem, 99.9%), $Nd_2O_3$ (Alfa Aesar, 99%), NiO (Alfa Aesar, 99%) and $Co_3O_4$ (Alfa Aesar, 99%). In a first step, the powders $Pr_6O_{11}$, $Nd_2O_3$ and $La_2O_3$ were pre-fired overnight at T=900° C. in order to remove the water content due to their high hygroscopic character. The precursors were weighed according to the composition of the nickelates and then ball-ground with zirconia balls and isopropanol (VWR, 99.8%) for 4 hours at 250 rpm. After drying overnight at 80° C., annealing was carried out at 1300° C. for 12 hours in air to obtain a pure phase. At a lower sintering temperature, some impurities were detected by the XRD. The sintering conditions of 1300° C./12 h result in well crystallized pure phases. The powders obtained were comminuted and ground again with zirconium dioxide balls and isopropanol for 8 h with the aim of obtaining an average particle size of approx. 1 μm (checked by means of particle size distribution and SEM).

The δ value at room temperature in air was determined by iodometric titration and TGA experiments. The powders were first balanced in air up to 1000° C., then cooled to room temperature at a slow rate (2° C. $min^{-1}$), with this cycle being repeated twice to ensure a stable state of the material, i.e. a reproducible oxygen content. A second cycle was then carried out under Ar-5% $H_2$ flow with a very slow heating rate of (0.5° C.·min⁻¹), with decomposition of the material leading to the determination of the oxygen stoichiometry after cycling the sample to room temperature (La$_2$O$_3$, Nd$_2$O$_3$, Pr$_2$O$_3$, Pr$_2$O$_3$, metallic Ni and Co depending on the composition). For all series, an increase in the δ value was observed upon cobalt substitution. For example, the δ values obtained are 0.25, 0.28 and 0.30 for Pr$^2$NiO$^{4+δ}$ (PNO), Pr$_2$Ni$_{0.9}$Co$_{0.1}$O$_{4+δ}$ (PNCO10) and Pr$_2$Ni$_{0.8}$Co$_{0.2}$O$_{4+δ}$ (PNCO20), respectively.

Electrochemical Performance and Durability as an Oxygen Electrode:

Electrochemical characterization was carried out with NiO—YSZ-supported cells (NiO YSZ///YSZ//GDC///electrode, CeramTec®, ASC-10C type). The oxygen electrode, i.e. the anode layers (nickelates) were deposited using the screen printing method and sintered in air at 1150° C. for 1 h. The sintering temperature (1150° C.) was optimized for the PNCO series to obtain a controlled homogeneous porous electrode microstructure. For the measurement, gold and nickel grids (1,024 cm⁻² mesh) were used as current collectors for the oxygen and fuel electrodes. The i-V characteristic curve was measured in the electrolysis mode from OCV to 1.5 V with a 50% H$_2$O and 50% H$_2$ gas mixture in the temperature range of 700-900° C. The impedance plots were recorded at OCV and from 1.0 to 1.5 V with an increase of 0.1 V, potentiostatically controlled with 50 mV AC amplitude, from 106 Hz to 10-1 Hz, with an IVIUM VERTEX potentiostat/galvanostat with an integrated frequency response analysis module.

An increase in cell performance was observed with cobalt substitution. The cell current densities obtained under the applied voltage of 1.5 V at 900° C. are 2.11, 2.41 and 3.0 A·cm⁻² for PNO, PNCO10 and PNCO20 single cells and at 800° C. the current densities are 1.6, 1.8 and 1.9 A·cm⁻² for PNO, PNCO10 and PNCO20 single cells (FIG. 1).

Figure 2:
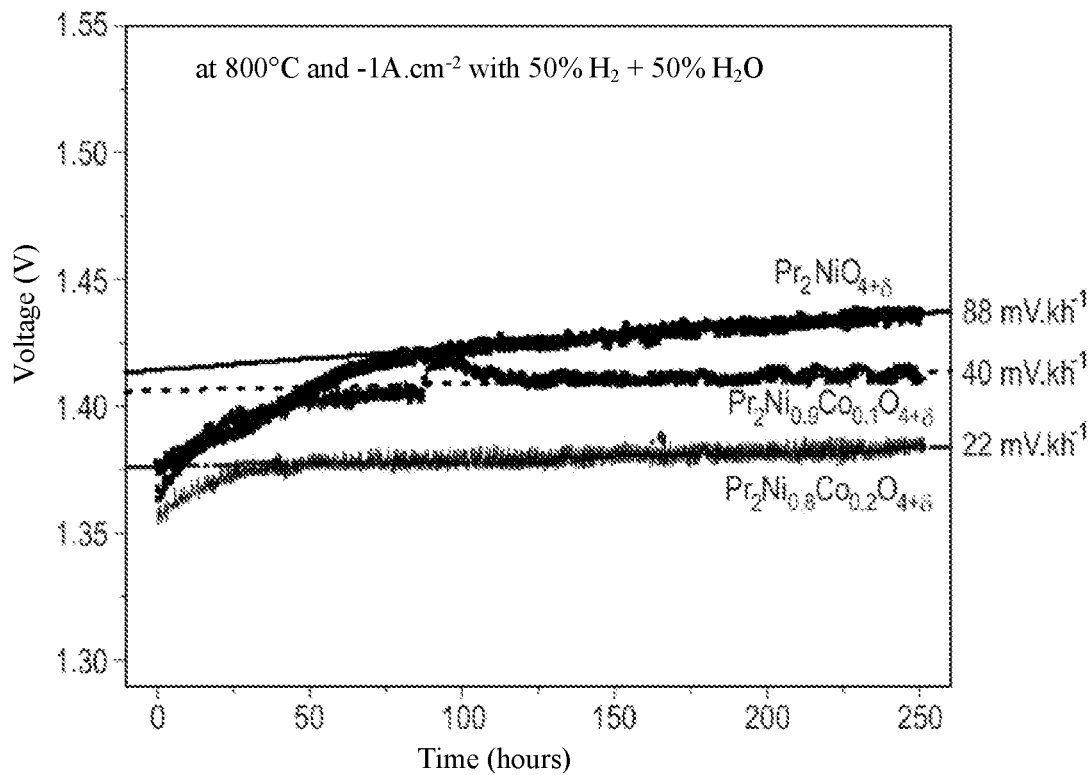
FIG. 2 shows the resistance of the single cells PNO, PNCO10 and PNCO20 at 800° C. and a current density of $-1$ $A\cdot cm^{-2}$ with a 50% $H_2$+50% $H_2O$ gas mixture.

The durability experiments were carried out with the nickelate electrodes containing single cells under SOEC conditions at 800° C. with high current density, i.e. −1.0 A·cm⁻², for up to 250 h with 50% H$_2$O and 50% H$_2$ (FIG. 2). All three cells behave differently during the durability test and initially show a rapid increase. The PNO cell shows a continuous increase up to 250 h, but the rate of increase is lower after 70-80 h. The electrolysis voltage increased from 1.38 to 1.43 V for PNO after 250 h, showing the highest total degradation among all. The degradation rate was estimated (in mV·kh⁻¹) by carrying out a linear adjustment in the voltage vs. A time curve was implemented and ~88 mV·kh⁻¹ was found for the PNO cell. However, the other two cells show lower degradation rates, i.e. ~40 mV·kh⁻¹ and ~22 mV·kh⁻¹ for PNCO10 and PNCO20 single cells, respectively. It is noteworthy that the PNCO20 single cell shows the least degradation after 250 hours under electrolysis conditions.

Of course, the invention is not limited to the embodiments shown in the figures. The above description is therefore to be considered as illustrative rather than limiting. The following claims are to be understood such that a mentioned feature is present in at least one embodiment of the invention. This does not preclude the presence of other features.

The invention claimed is:

1. Material for an electrode, the material comprising of a compound of formula (1)

$$M_2Ni_{1-x}Co_xO_{4+δ} \quad (1)$$

and/or of formula (2)

$$La_{1-y}M_yNi_{1-x}Co_xO_{4+δ} \quad (2)$$

where M represents Pr and/or Nd, 0.0≤x≤0.2, 0.25≤δ≤0.3 and 0<y<0.5, further comprising a compound of formula (3) LaNi$_{0.6}$Fe$_{0.4}$O$_{3-δ}$ (3) where 0<δ≤0.05, which is provided as a layer on the compound of formula (1) and/or of formula (2), and wherein the material has a perovskite structure.

2. Material according to claim 1, wherein δ of formulas (1) and (2) has the values 0.25, 0.28 or 0.3.

3. Material according to claim 1, wherein it is selected from Pr$_2$NiO$_{4+δ}$, Pr$_2$Ni$_{0.9}$Co$_{0.1}$O$_{4αδ}$, Pr$_2$Ni$_{0.8}$Co$_{0.2}$O$_{4+δ}$, Nd$_2$NiO$_{4+δ}$, Nd$_2$Ni$_{0.9}$Co$_{0.1}$O$_{4+δ}$, Nd$_2$Ni$_{0.8}$Co$_{0.2}$O$_{4+δ}$ and La$_{1.5}$Pr$_{0.5}$Ni$_{1-x}$Co$_x$O$_{4+δ}$.

4. Material according to claim 1, wherein the material has a layered perovskite structure.

5. Material according to claim 1, wherein it has an average particle size of 0.5 μm to 1 μm.

6. Material according to claim 1, wherein x has the values 0.0, 0.1 or 0.2.

7. Material according to claim 6, wherein δ of formulas (1) and (2) has the values 0.25, 0.28 or 0.3.

* * * * *